United States Patent [19]
Knudsen

[11] 3,993,466
[45] *Nov. 23, 1976

[54] FERTILIZER PRODUCTION

[75] Inventor: Knud Christen Bayer Knudsen, Toftevej, Denmark

[73] Assignee: Aktieselskabet Dansk Svovlsyre-OG Superphosphat-Fabrik, Copenhagen, Denmark

[*] Notice: The portion of the term of this patent subsequent to Mar. 28, 1989, has been disclaimed.

[22] Filed: Dec. 27, 1972

[21] Appl. No.: 316,301

Related U.S. Application Data

[63] Continuation of Ser. No. 737,814, June 18, 1968, abandoned.

[52] U.S. Cl. ................................ 71/33; 71/39; 423/319
[51] Int. Cl.² .................................. C05B 11/06
[58] Field of Search .............................. 71/37–41, 71/61; 423/306, 312, 181, 319, 321, 308; 23/312 P

[56] References Cited
UNITED STATES PATENTS

| | | | |
|---|---|---|---|
| 2,619,404 | 11/1952 | Skogseid | 23/102 A X |
| 2,793,953 | 5/1957 | Loo | 210/38 X |
| 3,121,004 | 2/1964 | Verheul | 71/39 |
| 3,347,656 | 10/1967 | Potts et al. | 71/36 |
| 3,382,035 | 5/1968 | Slater | 71/39 X |
| 3,433,617 | 3/1969 | Legal et al. | 71/39 X |
| 3,652,254 | 3/1972 | Knudsen | 210/38 |

FOREIGN PATENTS OR APPLICATIONS

| | | | |
|---|---|---|---|
| 615,069 | 2/1961 | Canada | 71/39 |
| 1,052,410 | 12/1966 | United Kingdom | 23/165 C |

*Primary Examiner*—Charles N. Hart
*Assistant Examiner*—Ferris H. Lander
*Attorney, Agent, or Firm*—Lawrence Rosen; E. Janet Berry

[57] ABSTRACT

Multinutrient synthetic fertilizers, containing potassium and phosphorus and, if desired, other elements of fertilizing value, are produced from phosphate rock or ore and potassium chloride in a method, in which calcium and chlorine are simultaneously removed as a solution of calcium chloride, said method comprising treating a solution of the phosphate rock or ore in a mineral acid with a cation exchanger charged with potassium ions in order to exchange at least part of the calcium ions of the phosphate rock solution with potassium ions, after which the ion exchanger and the solution are separated, the solution being worked up to the final fertilizer, and the ion exchanger being regenerated for renewed use.

1 Claim, No Drawings

FERTILIZER PRODUCTION

CROSS-REFERENCE TO RELATED APPLICATIONS

The present application is a continuation of application Ser. No. 737,814, filed June 18, 1968, now abandoned.

The invention relates to fertilizer production, and more particularly to a method for the production of a potassium- and phosphorus-containing synthetic fertilizer, using phosphate rock or ore and potassium chloride as the starting materials.

Phosphate rock or ore, being the starting material for almost all production of phosphorus-containing synthetic fertilizers, is a naturally occurring product, the composition of which varies from location to location, but the main constituent of which is fluorapatite, substantially corresponding to the formula $Ca_{10}(PO_4)_6F_2$.

Whereas formerly phosphate rock was mainly worked up to yield superphosphate, the tendency goes nowadays more and more in the direction of producing composite fertilizers containing other elements, besides phosphorus, which are essential in plant nutrition, namely potassium and nitrogen, and the present method aims at the production of such composite fertilizers, containing at least potassium, and possibly also nitrogen in satisfying amounts for fertilizing purposes. In the following, these fertilizer types will be referred to as PK-fertilizers and NPK-fertilizers, respectively.

In producing the composite fertilizers, the phosphorus content of the phosphate rock has to be brought into a soluble form to make it available for the plants, and this is generally done by treating the rock with a mineral acid, hereinafter referred to as the digestion.

The potassium of a composite fertilizer is generally supplied by potassium chloride, in most cases being the cheapest source of potassium.

The nitrogen may be supplied in various manners, for instance by using nitric acid for the digestion of the phosphate rock, or by neutralizing the acid digestion product with ammonia, if for instance sulphuric acid has been used for the digestion.

Thus, in producing a PK-fertilizer, the raw materials will normally supply calcium as well as chlorine in the final product in addition to the nutritionally valuable elements.

Both calcium and chlorine are generally undesired in the fertilizers, and a substantial part of the costs in making composite fertilizers from phosphate rock is due to the efforts to remove the calcium or to make it innocuous to such an extent that the phosphorus becomes available to the plants, and that the final product has physically acceptable properties.

Thus, calcium has been removed or made innocuous as sulphate, nitrate, phosphate, or carbonate, in various known methods of making composite fertilizers.

The presence of chlorine together with nitrogen in a series of the more commonly used NPK-fertilizers involves a special risk, because heating of the NPK-fertilizers may start a decomposition resulting in the liberation of toxic gases, which for the said NPK-fertilizers is particularly dangerous in that, once started, for example, by a local heating in a stored pile, it can proceed without further heat supply, since the processes themselves develop sufficient heat. If only for security reasons, therefore, it will be of great value, and in some cases, e.g. in copper-containing fertilizers, even necessary to be able to remove the otherwise unwanted chlorine.

It is the object of the present invention to provide an improved method of producing composite fertilizers having reduced contents of calcium and chlorine, using phosphate rock or ore, and potassium chloride as raw materials, simultaneously removing calcium and chlorine as a solution of calcium chloride.

The method of the invention accordingly comprises the steps of treating a solution of phosphate rock in a mineral acid with a cation exchanger charged with potassium ions for exchanging at least part of the calcium ions of the phosphate rock solution with potassium ions, after which the ion exchanger and the solution are separated, the solution being worked up to yield the fertilizer, and the ion exchanger being regenerated for renewed use by means of a potassium chloride solution.

If, for example, powdered phosphate rock is mixed with nitric acid, the liquid phase will eventually contain calcium and hydrogen as cations. The calcium ions and, to less extent, the hydrogen ions can be exchanged with potassium ions in contact with a potassium-charged cation exchange resin. The spent cation exchanger can then be regenerated by treatment with a strong solution of potassium chloride and used again. By the regeneration the absorbed calcium ions are replaced by potassium ions from the potassium chloride solution, and thus removed together with the chlorine ions when the ion exchanger is separated from the regenerating solution.

This basic principle of producing a composite fertilizer containing potassium and phosphorus may now be varied in different ways.

By carrying the ion exchange process more or less far, the degree to which calcium is exchanged for potassium can be varied, and thus it is possible, since the phosphorus content is not influenced, to adjust the resulting fertilizer as to the desired ratio between its phosphorus and potassium contents.

If it is desired as far as possible to remove calcium, a variation in the phosphorus to potassium ratio can be obtained by using a smaller or greater part of phosphoric acid in the mineral acid used for the digestion.

If a fertilizer is desired, containing nitrogen in addition to potassium and phosphorus, i.e. an NPK-fertilizer, this may also be accomplished according to the said basic principle by wholly or partly using nitric acid as the mineral acid for the digestion of the phosphate rock, or by neutralizing a surplus of digesting acid with ammonia.

When using nitric acid for the digestion, furthermore, part of the calcium may be removed as calcium nitrate before the ion exchange process.

It is also possible within the scope of this invention to contact the phosphate rock solution on one hand with a potassium-charged ion exchanger, and on the other hand with an ammonium-charged ion exchanger, by which one part of the calcium would be réplaced by potassium and another part with ammonium. An ammonium-charged ion exchanger can be regenerated with ammonia or, for example, with an ammonium carbonate solution, which may be produced from ammonia, carbon dioxide, and water. An ion exchanger charged with both potassium ions and ammonium ions may also be used, and be regenerated by means of an ammoniated solution of potassium chloride.

In some composite fertilizers, e.g. for use in fertilizing beets, a content of sodium is desirable. According to the invention this can be accomplished by using sea water for dissolving the potassium chloride to be used for regenerating the ion exchanger, which will then be charged with a mixture of potassium ions and sodium ions from the sea water. This presupposes sea water to be accessible at or near the fertilizer plant, but this will generally be the case, since sea transport of the raw materials, particularly the phosphate rock is a condition for profitable fertilizer production. A further economic gain resides in sea water being cheaper than fresh water.

The usual ion exchange processing of dilute solutions, in which the ion exchange resin is stationary, and the liquid is moving, is not particularly suited for the present purpose, where the acid slurry resulting from the digestion of the phosphate rock is strongly concentrated.

Preferably, therefore, a technique is used, in which the ion exchange resin and the digestion slurry are moved in countercurrent with continuous discharge of ion-exchanged slurry, and continuous or suitably spaced discharge of spent ion exchange resin, the latter being regenerated and returned to the cycle. By suitably adjusting the flow rates, this technique has proved suitable even up to 5N solutions.

The present method is further illustrated by the following examples.

EXAMPLE 1

44 kg of Morocco phosphate rock are dissolved in 77 kg of nitric acid, containing 56% $HNO_3$, and the solution is reacted with a cation exchanger of the sulphonated styrene-divinylbenzene copolymer type which has been charged with the potassium ions from 25 kg muriate of potash, containing 60% $K_2O$. The solution is subsequently ammoniated with 6.5 kg of $NH_3$. Upon granulating and drying 100 kg of a NPK-fertilizer are obtained, containing 14.7% N, 14.7% $P_2O_5$, and 14.7% $K_2O$. Practically all of the $P_2O_5$ is citratesoluble. The content of water soluble $P_2O_5$ is low.

EXAMPLE 2

28 kg of Morocco phosphate rock are dissolved in 55 kg of nitric acid, containing 56% $HNO_3$, and the solution is reacted with an ion exchanger of the type specified in Example 1, which has been charged with the potassium ions from 26 kg muriate of potash containing 60% $K_2O$. Then 34 kg of nitric acid, containing 56% $HNO_3$ and 9 kg of phosphoric acid containing 30% $P_2O_5$, are added to the solution, and the latter is ammoniated with 10.5 kg $NH_3$. Upon granulating and drying 100 kg of a NPK-fertilizer are obtained, containing 19.3% N, 12.0% $P_2O_5$ and 15.3% $K_2O$. Practically all of the $P_2O_5$ is citratesoluble and about 50% is water soluble.

EXAMPLE 3

37 kg of Morocco phosphate rock are digested with 100 kg of phosphoric acid of a strength corresponding to 30% $P_2O_5$. The reaction product is made into a slurry with water, and reacted with a cation exchanger resin of the type specified in Example 1, which has been charged with the potassium ions from 39 kg of potassium chloride, containing 60% $K_2O$. After separation of the ion exchanger, and upon granulating and drying 100 kg of PK-fertilizer are obtained, containing 40% $P_2O_5$ and 23% $K_2O$. Practically all of the $P_2O_5$ is water soluble.

I claim:

1. A process for the production of a nitrogen-, potassium- and phosphorus-containing fertilizer of reduced calcium and chlorine content from calcium-containing phosphate rock and potassium chloride which comprises the following sequential steps:
    a. reacting the calcium-containing phosphate rock with nitric acid to produce a reaction product mixture comprising a nitrogen-, calcium- and phosphorus-containing solution;
    b. contacting a potassium ion-charged, sulphonated styrene-divinylbenzene copolymer exchange resin, wherein at least a portion of said potassium ion-charged exchange resin may be replaced with an ammonium ion-charged exchange resin, with said solution whereby at least part of the calcium ions of the solution is exchanged with the potassium ions and ammonium ions;
    c. separating the calcium ion-containing exchange resin from the thus treated solution, the latter being worked up to yield the fertilizer;
    d. contacting the separated calcium-ion-containing exchange resin with a solution of potassium chloride containing a sufficient amount of ammonium ions to effect regeneration by exchanging the said calcium ions with potassium and ammonium ions, whereby calcium chloride solution is formed;
    e. separating the resulting regenerated ion-exchange resin from the calcium chloride solution; and
    f. recycling the separated regenerated ion-charged exchange resin to Step (b).

* * * * *